US008279060B2

(12) United States Patent
Liu et al.

(10) Patent No.: US 8,279,060 B2
(45) Date of Patent: Oct. 2, 2012

(54) WIRELESS MONITORING SYSTEM AND METHOD

(75) Inventors: Ying Liu, Anhui (CN); Jianqiang Ma, Anhui (CN)

(73) Assignee: Empire Technology Development LLC, Wilmington, DE (US)

( * ) Notice: Subject to any disclaimer, the term of this patent is extended or adjusted under 35 U.S.C. 154(b) by 425 days.

(21) Appl. No.: 12/538,884

(22) Filed: Aug. 11, 2009

(65) Prior Publication Data

US 2011/0037589 A1 Feb. 17, 2011

(51) Int. Cl.
*G08B 1/08* (2006.01)

(52) U.S. Cl. ............ 340/539.12; 340/539.11; 340/539.1

(58) Field of Classification Search .............. 340/539.12
See application file for complete search history.

(56) References Cited

U.S. PATENT DOCUMENTS

| 7,796,038 B2* | 9/2010 | Batra .................. 340/572.1 |
| 7,983,654 B2* | 7/2011 | Shelton et al. ............. 455/404.2 |
| 2002/0118121 A1* | 8/2002 | Lehrman et al. ......... 340/870.16 |
| 2006/0139166 A1* | 6/2006 | Choutier et al. ......... 340/539.12 |
| 2007/0229252 A1* | 10/2007 | Collins et al. ............ 340/539.13 |
| 2007/0268138 A1* | 11/2007 | Chung et al. ............... 340/572.1 |
| 2009/0058663 A1* | 3/2009 | Joshi et al. .................... 340/584 |
| 2009/0322540 A1* | 12/2009 | Richardson et al. ....... 340/573.7 |

OTHER PUBLICATIONS

David Geer, Users Make a Beeline for ZigBee Sensor Technology, Computer, Dec. 2005, pp. 16-19, IEEE Computer Society.
Youngbum Lee, Jinkwon Kim, Muntak Son, Myoungho Lee, Implementation of Accelerometer Sensor Module and Fall Detection Monitoring System based on Wireless Sensor Network, Proceedings of the 29th Annual International Conference of the IEEE EMBS, Aug. 2007, pp. 2315-2318, Lyon, France.
Josef Diermaier, Katharina Neyder, Franz Werner, Paul Panek, Wolfgang L. Zagler, Distributed Accelerometers as a Main Component in Detecting Activities of Daily Living, ICCHP 2008, LNCS 5105, 2008, pp. 1042-1049, Springer-Verlag Berlin Heideberg.

* cited by examiner

*Primary Examiner* — George Bugg
*Assistant Examiner* — Kerri McNally
(74) *Attorney, Agent, or Firm* — Ren-Sheng International

(57) ABSTRACT

A wireless monitoring system and method carries out wireless communication is carried out according to the ZigBee standard. The ZigBee standard allows for low-cost, low-power and high-density implementation of the wireless monitoring system and method, so that wireless monitoring system and method may be rolled out on a large scale to provide patient monitoring and other types of monitoring.

16 Claims, 4 Drawing Sheets

WIRELESS MONITORING SYSTEM AND METHOD

BACKGROUND

Unless otherwise indicated herein, the approaches described in this section are not prior art to the claims in this application and are not admitted to be prior art by inclusion in this section.

Senior citizen population has been increasing in recent years. In concert with the aging population, patient monitoring systems have seen an increase in demand. However, patient monitoring systems are generally expensive, and cannot be rolled out in large volumes economically. As a result, there has been a shortage of affordable patient monitoring systems. The problem is expected to get worse as the senior citizen population continues to increase along with the average lifespan.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

In the drawings.

DETAILED DESCRIPTION

Figure 1:
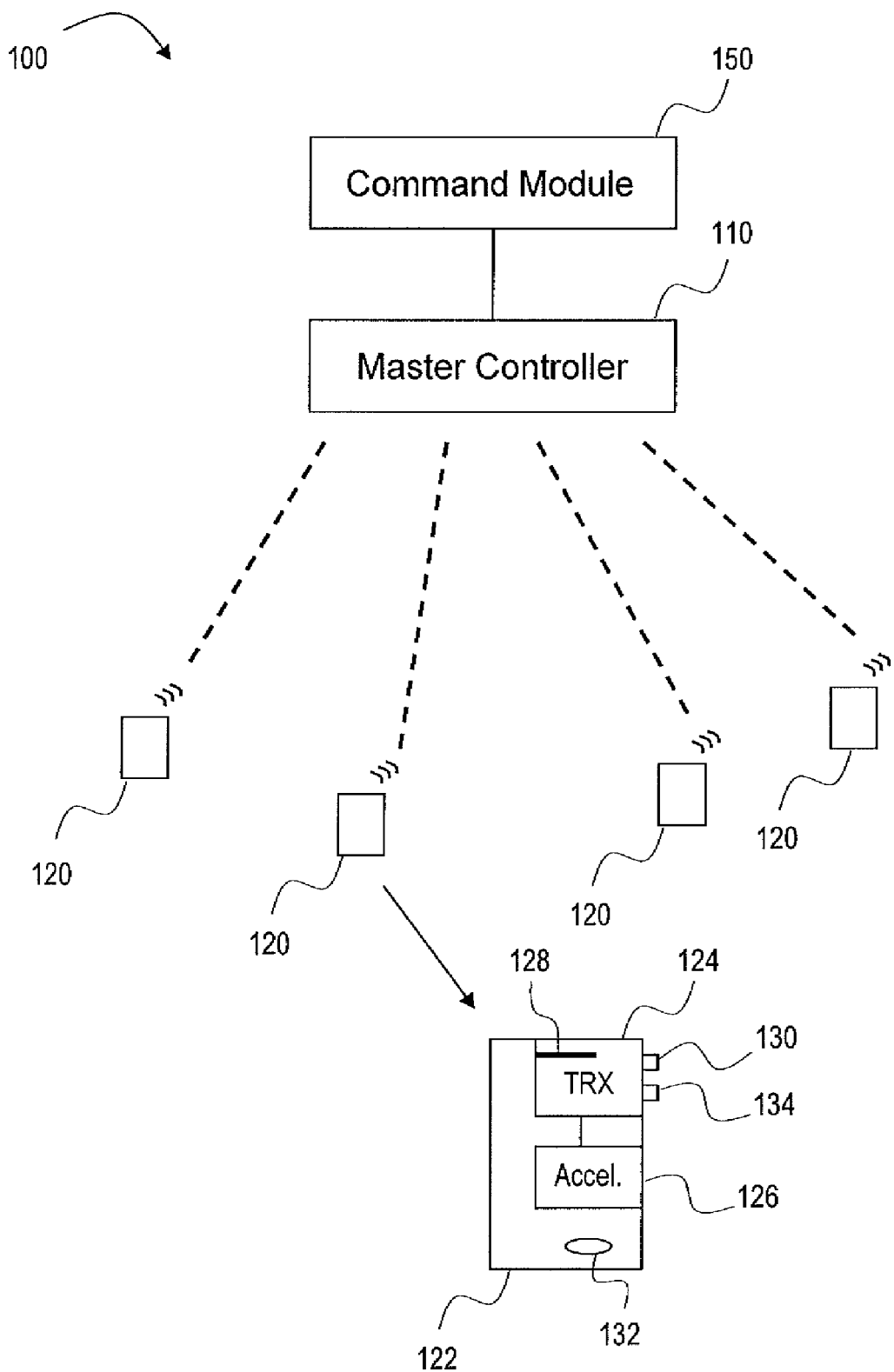
FIG. 1 is a diagram of a wireless monitoring system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to a wireless monitoring system and method.

FIG. 1 is a diagram of a wireless monitoring system according to at least some embodiments of the present disclosure. The wireless monitoring system 100 includes a master controller 110 that wirelessly communicates with multiple monitoring modules 120 according to a direct sequence spread spectrum modulation standard known as ZigBee. Each monitoring module 120 has a housing 122 that contains a transceiver chip 124 having an integrated antenna 128 and an accelerometer 126. For transceiver chip 124, MC13213 chip available from Freescale Semiconductor may be used. For accelerometer 126, an example Micro-Electro-Mechanical System (MEMS) accelerometer available from MEMSIC, Inc. may be used.

Transceiver chip 124 has a serial port to which accelerometer 126 is electrically connected. Accelerometer 126 senses acceleration of housing 122 and a person or an object to which housing 122 is mounted and outputs a voltage signal that is roughly proportional to the sensed acceleration, to the serial port of transceiver chip 124. Transceiver chip 124 compares the voltage level of the voltage signal from accelerometer 126 with a threshold to determine whether an alarm condition exists. If the voltage level is greater than the threshold, a configurable bit on transceiver chip 124 is set to 1. This bit is referred to herein as the "alarm bit." It is set to 1 if an alarm condition exists. The alarm bit remains set at 1 until it is reset. The alarm bit can be reset by actuation of a reset button 130 or by a reset command signal from master controller 110.

Housing 122 also contains a battery 132. For most applications, battery 132 is non-rechargeable because the ZigBee standard is a low-power standard and, and under normal operating conditions, battery 132 is expected to last multiple years without a recharge. When non-rechargeable batteries are used, the per-device cost and thus the total system cost is expected to decrease. However, rechargeable batteries may be used in some embodiments of the present disclosure even though they add cost.

Housing 122 of monitoring module 120 is configured to be worn on a torso of a human body so that it can be used to monitor unexpected accelerations of a patient or a senior citizen who is wearing the device. Given the limited physical capabilities of patients and senior citizens, it can be expected that their accelerations should not exceed a certain value, e.g., 0.5 g. When monitoring module 120 detects such a condition, it can reasonably be assumed that an accident or some event that needs investigating has occurred.

Monitoring module 120 also has a tuning knob 134 for adjusting the threshold. By increasing the threshold, the sensed accelerations that would give rise to an alarm condition would correspondingly increase. By decreasing the threshold, the sensed accelerations that would give rise to an alarm condition would correspondingly decrease.

Command module 150 monitors alarm signals received by master controller 110 and outputs such conditions for human intervention. For example, the alarm conditions may be displayed on a display unit or an audible alarm may be issued. Command module 150 includes conventional components of a computer system and it is programmed to process alarm signals received by master controller 110 and alert a human operator through a visible or an audible alarm.

Master controller 110 includes a transceiver chip that operates according to the ZigBee standard. MC13213 chip available from Freescale Semiconductor may also be used as this transceiver chip. When multiple monitoring modules 120 transmit alarm signals to master controller 110, there is a risk of signal collision and signal loss. Therefore, master controller 110 is configured to poll each monitoring module 120 one at a time and each monitoring module is configured to transmit an alarm signal only if: (1) it has been polled, and (2) the alarm bit is set therein. The alarm signal received at master controller 110 is passed to command module 150, which alerts a human operator through a visible or an audible alarm. In the case where the alarm bit at monitoring module 120 is reset using a reset command signal from master controller 110, the reset command signal may be issued the next time master controller 110 polls monitoring module 120 that had its alarm signal processed by master controller 110.

Figure 2:
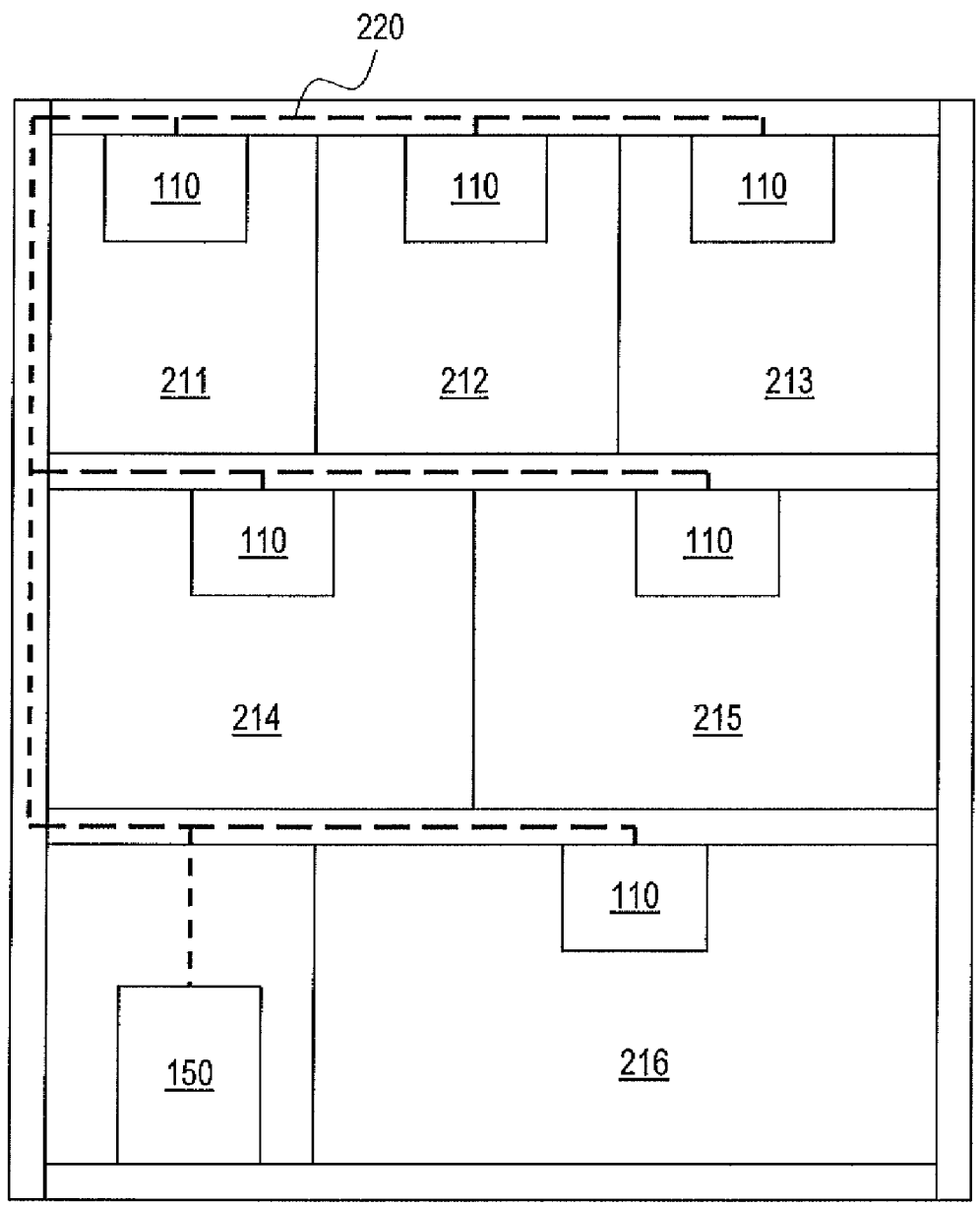
FIG. 2 is a diagram of a building structure in which multiple wireless monitoring systems of FIG. 1 can be implemented.

FIG. 2 is a diagram of a building structure in which multiple wireless monitoring systems of FIG. 1 can be implemented. For clarity, monitoring modules 120 are not illustrated in FIG. 2. However, it is understood that each monitored zone 211-216 includes a multiple number of such devices. Although the ZigBee standard provides a longer transmission range than the Bluetooth standard, about 10 to 75 meters, multiple monitoring zones may be needed for large building structures such as hospitals. When there are multiple monitoring zones as shown in FIG. 2, a master controller 110 is provided per zone to wirelessly communicate with monitoring modules 120 within its zone. The dotted line in FIG. 2 indicates a wired connection 220 between all master controllers 110 and a command module 150.

Figure 3:
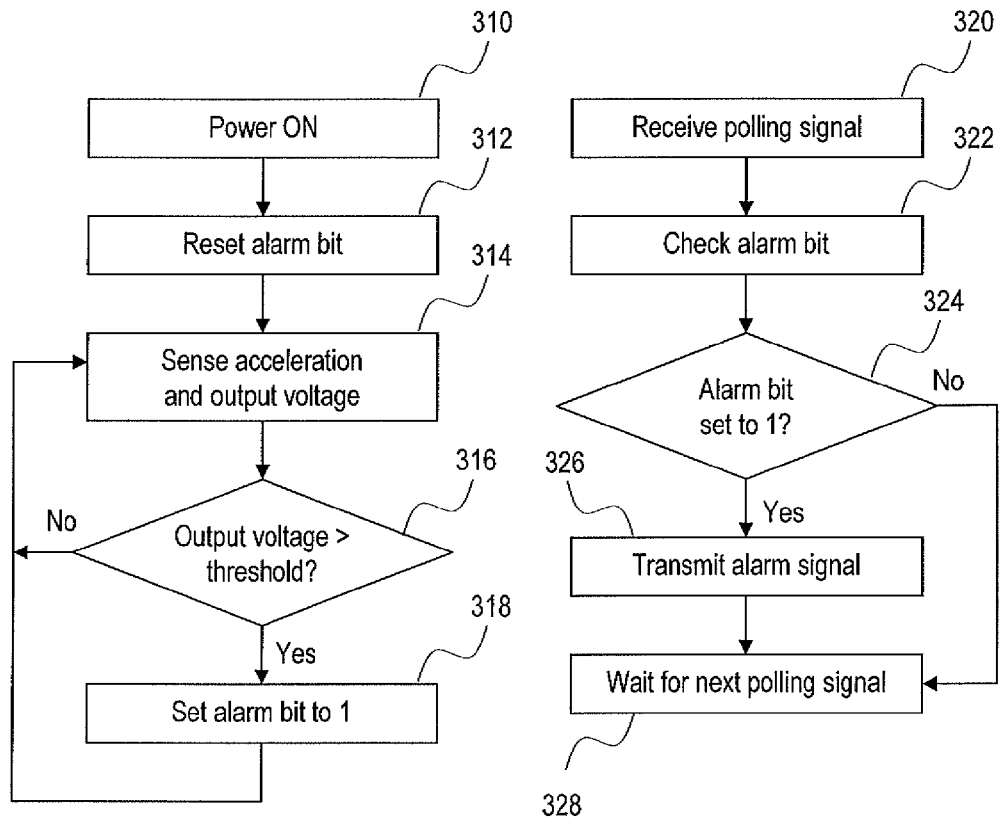
FIG. 3 is a flow diagram illustrating a process of monitoring carried out by individual monitoring modules of FIG. 1.

FIG. 3 is a flow diagram illustrating a process of monitoring carried out by individual monitoring modules of FIG. 1. The process begins with the power-up of the monitoring module (Operation 310) and resetting of the alarm bit to 0 (Operation 312). Then, the sensing of the acceleration, and outputting of a voltage signal that is roughly proportional to the sensed acceleration (Operation 314) are carried out by the accelerometer. In Operation 316, the transceiver chip compares the voltage level of the voltage signal received from the accelerometer through its serial port with the threshold. If the threshold is exceeded, the transceiver chip sets the alarm bit to 1 (Operation 318) and the process returns to Operation 314. If the threshold is not exceeded, the alarm bit is not changed and the process returns to Operation 314.

When the transceiver unit receives a polling signal from the master controller (Operation 320), Operation 322 and subsequent operations are carried out. At Operation 322, the alarm bit is checked. If the alarm bit is at 1, an alarm signal is issued through the transceiver chip to the master controller (Operation 326). If the alarm bit is at 0, Operation 326 is skipped and the transceiver chip waits for the next polling signal (Operation 328).

At any time during the above operations, if transceiver unit recognizes that a reset button has been actuated or a reset command signal has been received from the master controller, the alarm bit is set to 0.

Figure 4:
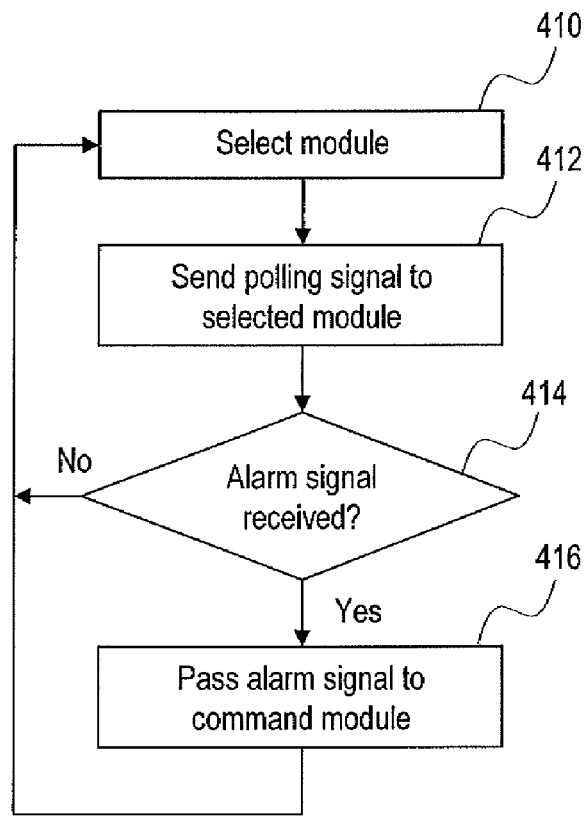
FIG. 4 is a flow diagram illustrating a process of monitoring carried out by a master controller of the wireless monitoring system of FIG. 1, all arranged in accordance with at least some embodiments of the present disclosure.

FIG. 4 is a flow diagram illustrating a process of monitoring carried out by a master controller of the wireless monitoring system of FIG. 1. Before this process is begun, the master controller has undergone a handshaking process with all of the monitoring modules within its zone. As a result, the master controller is able to uniquely identify each of the monitoring modules within its zone.

The process begins with the master controller selecting a monitoring module (Operation 410). Then, the master controller transmits a polling signal to the selected monitoring module (Operation 412). A reset command signal may be issued with the polling signal if the selected monitoring module has previously indicated an alarm condition and after appropriate personnel has been alerted of the alarm condition through the command module. The master controller waits a predetermined amount of time during which it checks to see if an alarm signal has been transmitted by the selected monitoring module (Operation 414). If the alarm signal has been transmitted by the selected monitoring module and received by the master controller, the master controller passes the alarm signal and the identity of the monitoring module to the command module 150 (Operation 416) and then returns to Operation 410 to select the next monitoring module to poll. If the alarm signal is not received, the master controller returns directly to Operation 410 to select the next monitoring module to poll. After all monitoring modules have been polled, the entire process repeats again.

In the wireless monitoring system and method described above, the wireless communication is carried out according to the ZigBee standard. The ZigBee standard is designed as a wireless personal area network, just like the well-known Bluetooth standard, but with important differences that allows the implementation of the wireless monitoring system and method according to the ZigBee standard to be less expensive.

ZigBee runs in the 2.4 GHz unlicensed frequency band and employs the direct sequence spread spectrum modulation. Bluetooth also runs in the 2.4 GHz unlicensed frequency band, but employs frequency hopping spread spectrum modulation technique. As compared to Bluetooth, ZigBee has less bandwidth (250 Kbps vs. 1 Mbps), and uses less power (battery life is years vs. days), has longer range (70 meters v. 10 meters), and enables far more devices to be networked (255 to 65,000 vs. 8). One of the major factors of lower cost is the power source. A more expensive rechargeable battery is not necessary with the lower power consumption of a system operating according to the Zigbee standard. Also, the ability to provide higher density networks contributes to the lower cost of the total system. Finally, the protocol stack size for ZigBee is much smaller (28 Kbytes vs. 250 Kbytes). This means simpler device designs, which also translate into lower cost.

With the above-mentioned lower cost advantages, the wireless monitoring system and method according to the at least some embodiments of the present disclosure may be implemented on a large scale to provide patient monitoring as well as other types of monitoring.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A wireless monitoring system comprising:
   a master controller having a wireless transmitting unit and a wireless receiving unit;
   a first module being remote to the master controller and having a first accelerometer, a first wireless transmitting unit and a first wireless receiving unit, the first module being configured with a first alarm bit that is set to indicate an alarm condition when the first accelerometer senses a first acceleration above a first threshold; and
   a second module being remote to the master controller and having a second accelerometer, a second wireless transmitting unit and a second wireless receiving unit, the second module being configured with a second alarm bit that is set to indicate an alarm condition when the second accelerometer senses a second acceleration above a second threshold,
   wherein the master controller is programmed to issue a polling signal to the first module and the second module at separate times, and each of the first module and the second module is configured to respond to the polling signal if the respective first alarm bit or the second alarm bit therein is set and ignore the polling signal if the respective first alarm bit or the second alarm bit therein is not set.

2. The wireless monitoring system according to claim 1, wherein the master controller and the first and second modules communicate using a direct sequence spread spectrum modulation technique.

3. The wireless monitoring system according to claim 1, wherein each of the first module and the second module is configured to reset the respective first alarm bit or the second alarm bit to no longer indicate the alarm condition, in response to a reset signal.

4. The wireless monitoring system according to claim 3, wherein the reset signal is received from the master controller.

5. The wireless monitoring system according to claim 3, wherein each of the first module and the second module includes a reset button, and the reset signal is generated in response to an actuation of the reset button.

6. The wireless monitoring system according to claim 1, wherein each of the first module and the second module includes a control unit that is programmed to receive a voltage output from the first accelerometer and the second accelerometer respectively, and determine the alarm condition based on a comparison of the voltage output and a threshold voltage.

7. The wireless monitoring system according to claim 1, wherein the first wireless transmitting unit and the first wireless receiving unit of the first module are integrated on a first single transceiver chip, and the second wireless transmitting unit and the second wireless receiving unit of the second module are integrated on a second single transceiver chip.

8. A device comprising:
   an accelerometer; and
   a wireless communication chip configured to communicate with a base station using a direct sequence spread spectrum modulation technique and to determine whether a voltage output of the accelerometer exceeds a threshold,
   wherein the wireless communication chip issues an alarm signal to the base station if the voltage output of the accelerometer exceeds the threshold when a polling signal is received from the base station, the wireless communication chip includes an alarm bit that is set to indicate an alarm condition when the voltage output of the accelerometer exceeds the threshold, and the wireless communication chip ignores the polling signal and the issuing of the alarm signal if the alarm bit is not set.

9. The device according to claim 8, wherein the wireless communication chip is configured to reset the alarm bit to no longer indicate the alarm condition, in response to a reset signal.

10. The device according to claim 8, further comprising a reset button, and the reset signal is generated in response to an actuation of the reset button.

11. The device according to claim 8, further comprising a non-rechargeable battery.

12. A method of monitoring a device for an alarm condition, the method comprising:
    receiving a polling signal from a base station;
    sensing a voltage output of an accelerometer that is installed in the device;
    comparing the sensed voltage output with a threshold;
    setting an alarm bit if the sensed voltage output exceeds the threshold; transmitting an alarm signal to the base station if the alarm bit is set at the time the polling signal is received from the base station; and
    ignoring the polling signal and the transmitting of the alarm signal if the alarm bit is not set at the time the polling signal is received from the base station,
    wherein the polling signal is received from the base station and the alarm signal is transmitted to the base station using a direct sequence spread spectrum modulation technique.

13. The method according to claim 12, wherein the voltage output is sensed and compared to the threshold at periodic intervals.

14. The method according to claim 12, further comprising:
    resetting the alarm bit to no longer indicate an alarm condition.

15. The method according to claim 12, further comprising:
    sensing a manual actuation of a reset button; and
    resetting the alarm bit to no longer indicate an alarm condition, in response to the manual actuation of the reset button.

16. The method according to claim 12, further comprising:
    adjusting the threshold.

* * * * *